United States Patent
Lai et al.

(10) Patent No.: US 11,802,666 B2
(45) Date of Patent: Oct. 31, 2023

(54) SEALING MECHANISM OF PRESSURE VESSEL

(71) Applicant: JEN SIAN INDUSTRIAL CO., LTD., Taichung (TW)

(72) Inventors: Cheng-Wei Lai, Taichung (TW); Fu-Kai Chuang, Taichung (TW)

(73) Assignee: JEN SIAN INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/691,883

(22) Filed: Mar. 10, 2022

(65) Prior Publication Data

US 2022/0307654 A1    Sep. 29, 2022

(30) Foreign Application Priority Data

Mar. 29, 2021   (TW) .................................. 110111370

(51) Int. Cl.
    *F17C 13/06* (2006.01)
(52) U.S. Cl.
    CPC ...... *F17C 13/06* (2013.01); *F17C 2205/0311* (2013.01)

(58) Field of Classification Search
    CPC ....... B60T 17/043; B60T 17/222; B67D 7/52; F17C 13/06; F17C 2205/0311
    See application file for complete search history.

(56) References Cited

U.S. PATENT DOCUMENTS

2022/0063985 A1*   3/2022  Clever .................... B67D 7/04

FOREIGN PATENT DOCUMENTS

| TW | M489114 | 11/2014 |
|---|---|---|
| TW | M598804 | 7/2020 |

\* cited by examiner

*Primary Examiner* — Shawn M Braden
(74) *Attorney, Agent, or Firm* — GUICE PATENTS PLLC

(57) ABSTRACT

Main technical features of a sealing mechanism of a pressure vessel provided by the invention are a sealing unit for airtightly combining with the vessel, and a combination unit for positioning the sealing unit in the airtight combination state, and there are common structures disposed between constituent elements of the sealing unit and the combination unit, so that the sealing unit and the combination unit can be combined with each other in order to facilitate use and storage and to avoid losing or missing parts.

19 Claims, 7 Drawing Sheets

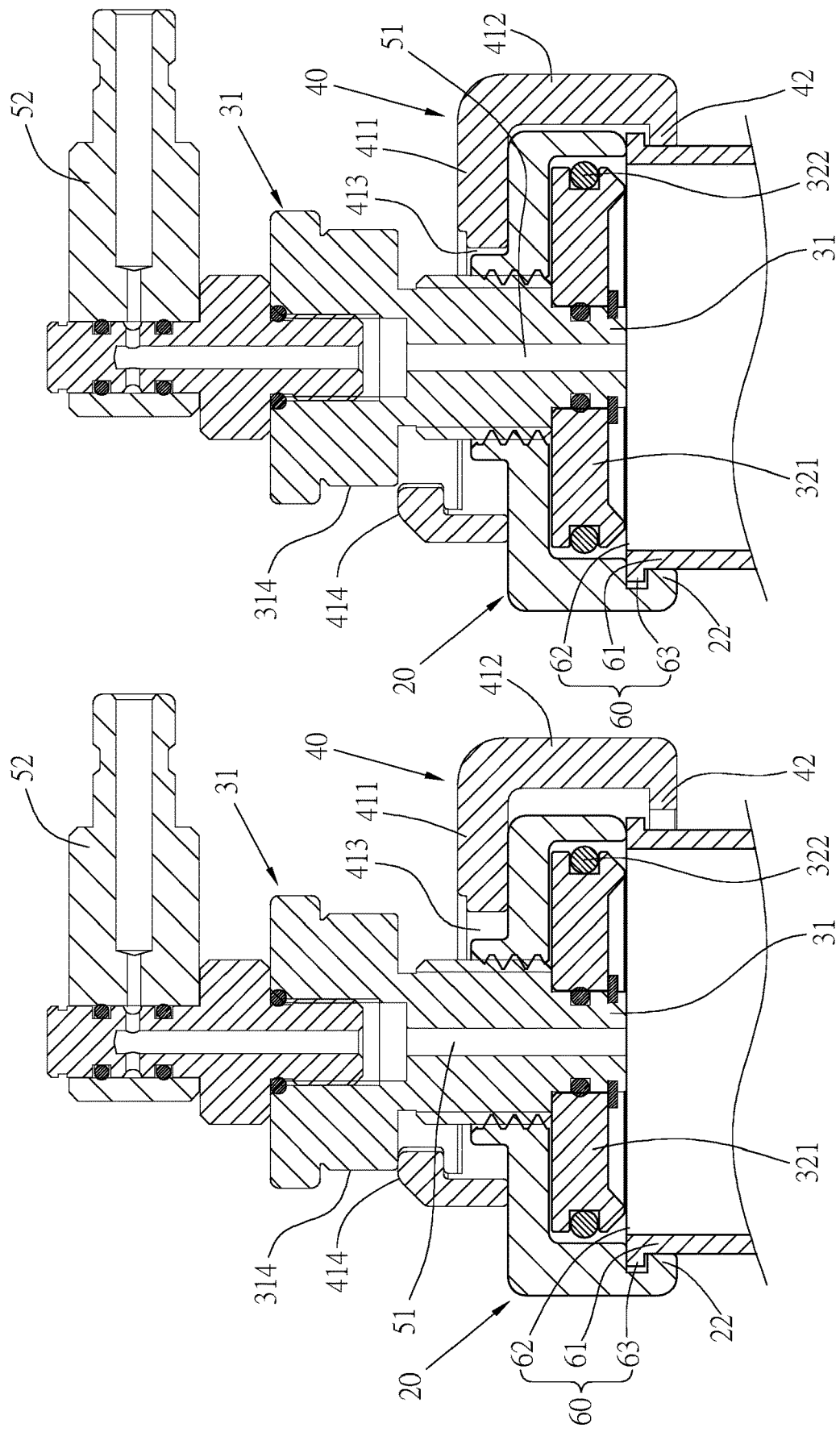

SEALING MECHANISM OF PRESSURE VESSEL

BACKGROUND OF THE INVENTION

Field of Invention

The invention relates to vessel sealing technology, and more particularly to a sealing mechanism of a pressure vessel.

Related Art

In the technology that needs to change the pressure state in a bottle, such as a vehicle brake fluid bottle, to carry out vehicle maintenance operation, a connecting pipeline is usually inserted into the bottle structure airtightly to form a tubular neck inside the bottle opening, and a suitable fixing element is used to maintain the combined state between the connecting pipeline and the tubular neck in order to avoid changes of pressure in the bottle to affect the airtight combination state between the connecting pipeline and the neck. Specific contents of the technology are disclosed in Taiwan's patent No. M489114 or No. M598804, both of which are provided with the arc-shaped retaining ring fastened on the peripheral flange of the free end of the neck and the ring-shaped flange of the connecting pipeline, so that the connecting pipeline can be tightly combined in the neck.

Although the above-mentioned conventional technology is technically simplified to achieve the effect of fixing through the simple additional retaining ring solely, because there is no proper connection technology between the various components, it is easy to lose the parts or difficult to find the parts, resulting in increasing the workload of the staff.

SUMMARY OF THE INVENTION

Therefore, a main object of the invention is to provide a sealing mechanism of a pressure vessel comprising a component for forming an airtight combination state with the vessel and a component for ensuring the airtight state, and a proper connecting relationship is provided between the two components in order to facilitate using by a staff.

In order to achieve the above-mentioned object, main technical features of the sealing mechanism of the pressure vessel provided by the invention are a sealing unit for airtightly combining with the vessel, and a combination unit for positioning the sealing unit in the airtight combination state, and there are common structures disposed between constituent elements of the sealing unit and the combination unit, so that the sealing unit and the combination unit can be combined with each other in order to facilitate use and storage and to avoid losing or missing parts.

Wherein the constituent elements for forming the common structures can be a first body part of the combination unit, and a driving element of the sealing unit disposed between the first body part and a blocking element, thereby a connection relationship can be maintained between the blocking element and the first body part while the driving element drives the blocking element to move in order to achieve an object and an efficacy of combining the sealing unit and the combination unit with each other.

In order to facilitate combination between the combination unit and the vessel, the combination unit can further comprise a first hook edge extending arcuately and protruding on a part of the first body part for hooking and snapping on a tubular neck of the vessel so that the combination unit can be combined on the vessel.

In order for the sealing unit to conveniently seal an opening of the vessel, when the first hook edge is snapped on the neck, another part of the first body part is positioned on the vessel outside the opening at an end of the neck of the vessel, and the blocking element is interposed between the other part of the first body part and the opening of the vessel, so that the driving element attached on the first body part is capable of driving the blocking element to move to seal or block the opening of the vessel.

Specifically, the first body part comprises a carrier plate; a ring wall extending outwardly from a peripheral end of the carrier plate; and an arc sheet-shaped first arcuate wall extending outwardly from a side end of the carrier plate and coaxially with the ring wall and protruding outside an end of the ring wall, and the first hook edge is protrudingly disposed on an inner concave arc surface of an extension end of the first arcuate wall.

Wherein the first body part further comprises an axial hole penetrating the carrier plate, and a hole axis of the axial hole is the same as a geometric center of the ring wall; the driving element has a column with a middle section of the column inserting into the axial hole, and one end of a column axis is located inside of the ring wall and combined with the blocking element.

In order to increase a bonding strength between the combination unit and the vessel and maintain a state of the opening of the vessel being sealed by the blocking element, the sealing mechanism for the pressure vessel can further comprise an auxiliary unit provided with a second hook edge corresponding to the first hook edge, thereby with the first hook edge and the second hook edge respectively hooking and snapping on a peripheral side of the neck of the vessel, a stable combination and fixing effect can be obtained.

Wherein the auxiliary unit has a second body part adjacent to the first body part, the arcuately extending second hook edge is protruded on a part of the second body part, and arcuate centers of curvature of the second hook edge and the first hook edge are located between the first hook edge and the second hook edge.

Wherein the second body part further comprises a sliding plate with one side attached on the first body part; an arc sheet-shaped second arcuate wall extending outwardly from one end of the sliding plate, and the second hook edge is protrudingly disposed on an inner concave arc surface of an extension end of the second arcuate wall; and a radially elongated hole extending along a radial direction of the second arcuate wall to penetrate the sliding plate.

Wherein the driving element has a column inserting into the elongated hole, so that the sliding plate is capable of being constrained by the column to displace back and forth between a distant position and a close position along a length direction of the elongated hole, when the sliding plate is at the distant position, the second arcuate wall and the first arcuate wall are separated by a first distance, when the sliding plate is at the close position, the second arcuate wall and the first arcuate wall are separated by a second distance, and the second distance is smaller than the first distance.

In order to position the sliding plate at a position, the second body part can further comprise a first positioning body protrudingly disposed at a position on the sliding plate corresponding to the length direction of the elongated hole and away from the second arcuate wall, and the driving element further comprises a second positioning body protrudingly disposed on a peripheral side of the column and abutted with the first positioning body to position the sliding plate at the close position.

Wherein the column is capable of moving between a release position and a locked position along a direction of its column axis, when in the release position, the second positioning body and the first positioning body are separated from each other, when in the locked position, the second positioning body interposed between the first positioning body and the column is abutted with the first positioning body.

BRIEF DESCRIPTION OF THE DRAWINGS

FIG. 6 is a cross-sectional view of a preferred embodiment of the invention snapped on a neck of a vessel showing that a first hook edge has been hooked and snapped on an annular opening edge of the neck.

FIG. 7 is a cross-sectional view of a preferred embodiment of the invention snapped on the neck of the vessel showing that a second hook edge has been hooked and snapped on the annular opening edge of the neck.

DETAILED DESCRIPTION OF THE INVENTION

Figure 1:
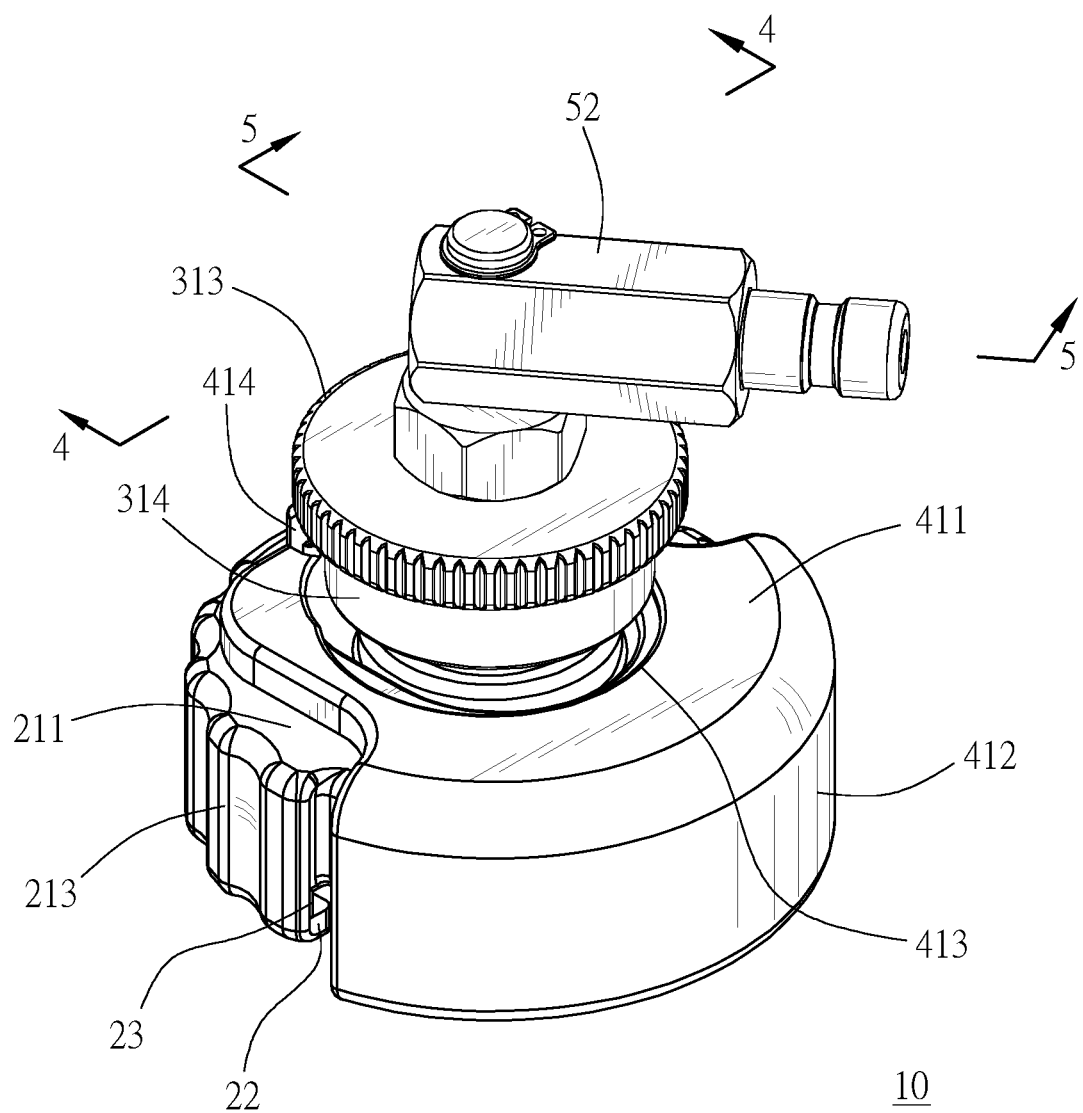
FIG. 1 is a perspective view of a preferred embodiment of the invention.
Figure 2:
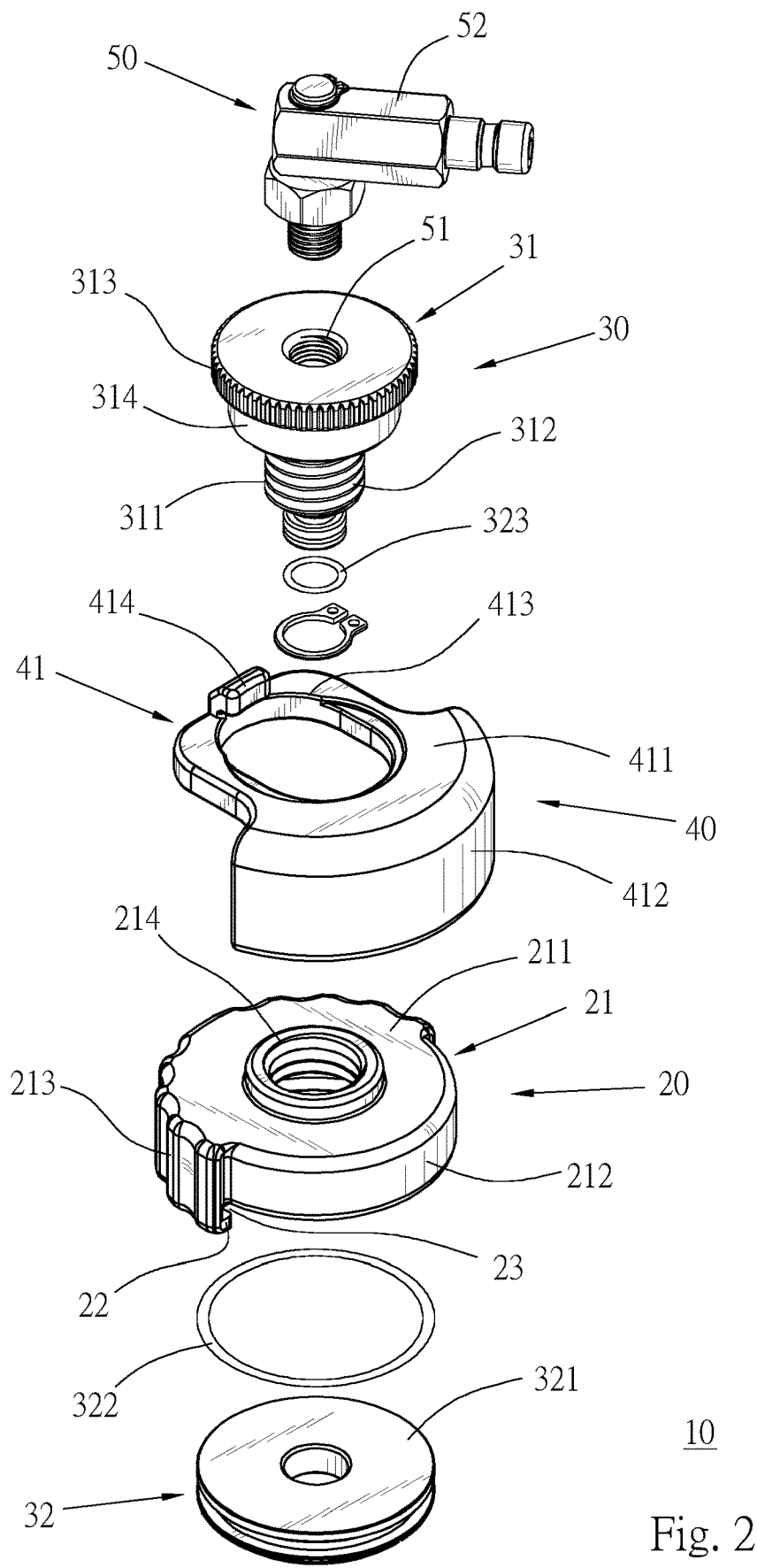
FIG. 2 is an exploded view of a preferred embodiment of the invention.
Figure 3:
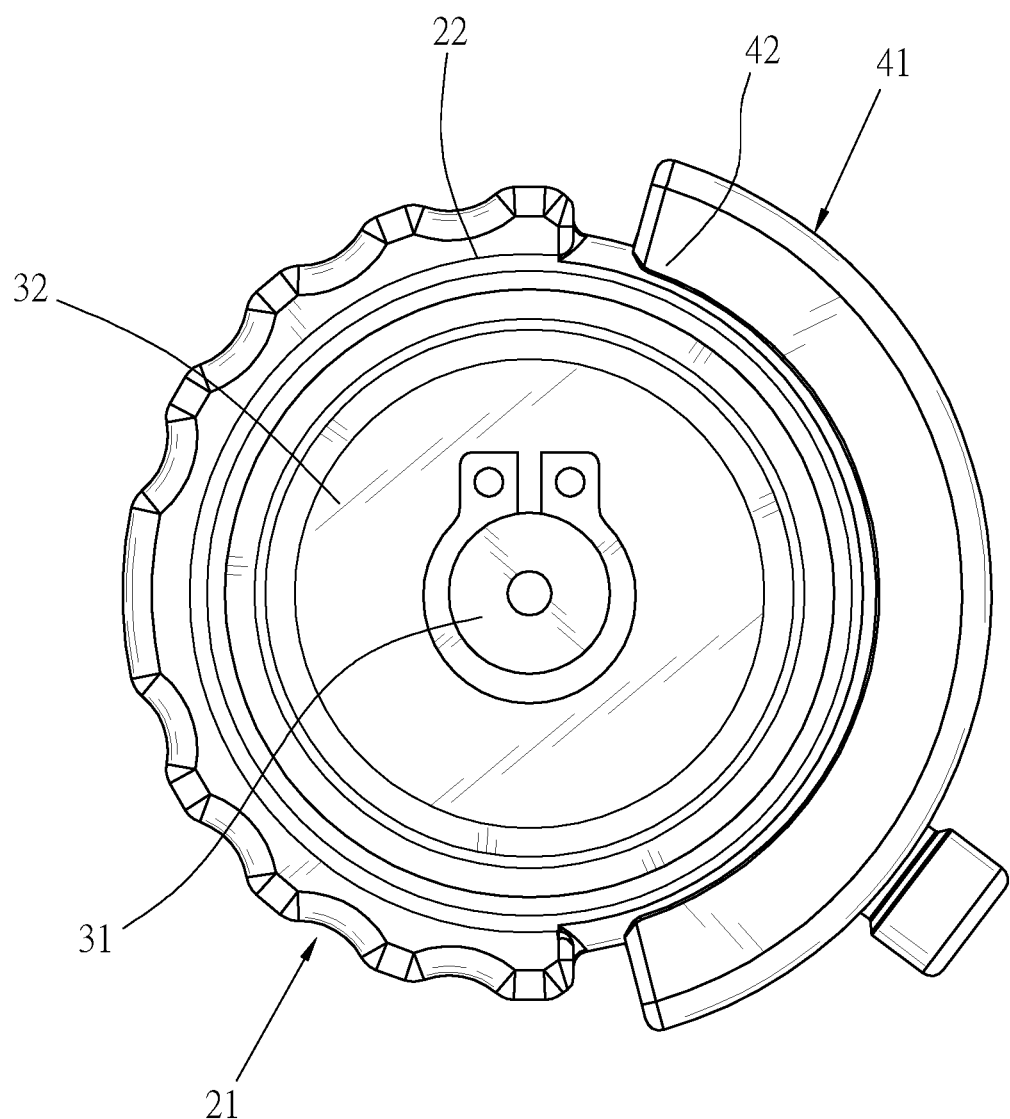
FIG. 3 is a bottom view of a preferred embodiment of the invention.
Figure 4:
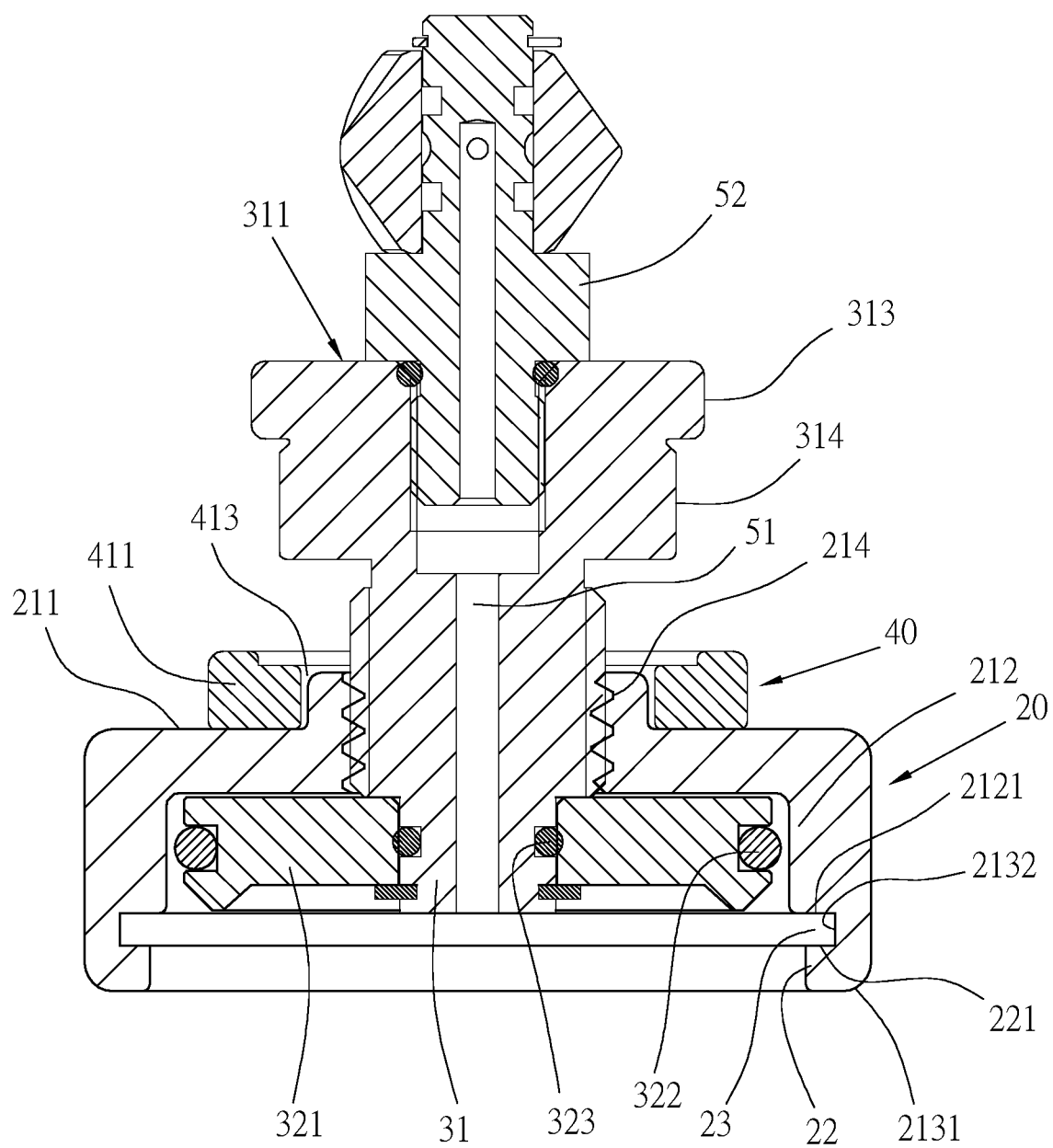
FIG. 4 is a cross-sectional view of a preferred embodiment of the invention along the section line 4-4 in FIG. 1.
Figure 5:
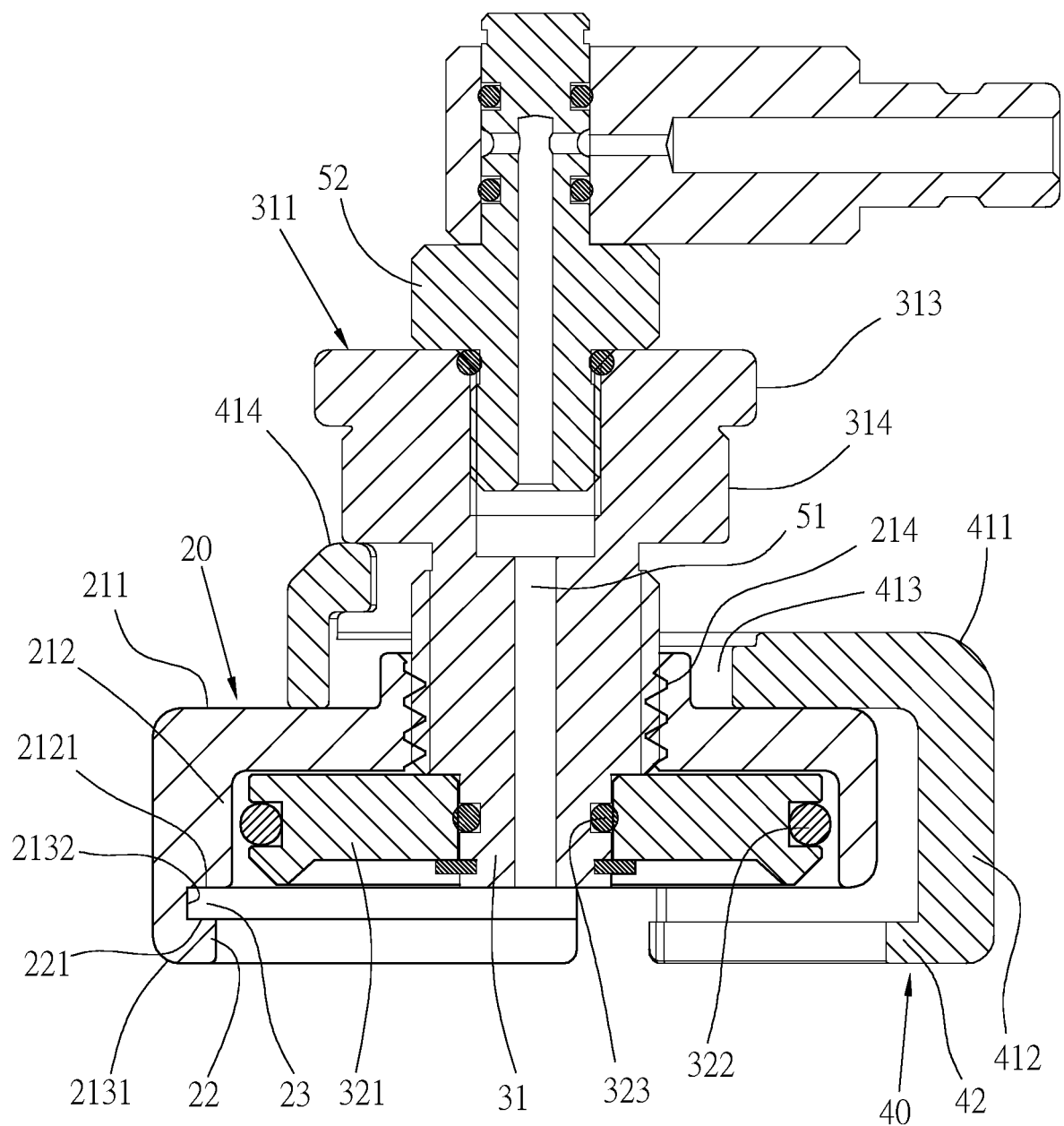
FIG. 5 is a cross-sectional view of a preferred embodiment of the invention along the section line 5-5 in FIG. 1.

First of all, it should be explained that the words first, second with sequential meanings in this specification are merely used for an object of distinguishing similar components, and do not intend to mean that the components have sequential orders in function or structure. Therefore, the literal meanings of the words first, second do not limit an order in which the components appear in this specification.

Please refer to FIG. 1 to FIG. 5. In a preferred embodiment of the invention, a sealing mechanism 10 of a pressure vessel mainly comprises a combination unit 20, a sealing unit 30, an auxiliary unit 40 and a connecting unit 50.

The combination unit 20 has a first body part 21, a first hook edge 22 provided on a part of the first body part 21, and an arcuate embedding groove 23.

The first body part 21 has a carrier plate 211 in the shape of a circular sheet; an annular ring wall 212 extending outwardly from a peripheral side of the carrier plate 211 and coaxially with a center of curvature of the carrier plate 211; a sheet-shaped first arcuate wall 213 with a suitable radian extending outwardly from one side end of the carrier plate 211 by attaching to an outer ring surface of the ring wall 212 and coaxially with a center of curvature of the ring wall 212, and an extension length of first arcuate wall 213 is greater than an extension length of the ring wall 212, so that an extension end 2131 of the first arcuate wall 213 protrudes outside of an extension end 2121 of the ring wall 212; and an axial hole 214 with a screw thread annularly disposed on a hole wall penetrating the carrier plate 211 along the center of curvature of the carrier plate 211.

The first hook edge 22 is protrudingly disposed on an inner concave arc surface 2132 of the extension end 2131 of the first arcuate wall 213 and has a radian the same as that of the inner concave arc surface 2132 of the first arcuate wall 213, thereby the inner concave arc surface 2132 of the first arcuate wall 213, an end surface of the extension end 2121 of the ring wall 212, and an inner edge surface 221 of the first hook edge 22 jointly define the embedding groove 23.

The sealing unit 30 is provided with a driving element 31 and a blocking element 32 combined with the driving element 31.

The driving element 31 has a column 311 with a suitable length and with a middle section coaxially inserting into the axial hole 214, and two ends of a column axis are respectively located outside of two sides of the carrier plate 211; a screw thread 312 annularly disposed on an outer peripheral side of the middle section of the column 311 to be screwed and connected with the screw thread of the hole wall of the axial hole 214, so that movement of angular displacement of the column 311 is converted into linear displacement along its axial direction by thread connection; a ring-shaped rotating block 313 coaxially protruded on one end of the column 311 in the axial direction; and a ring-shaped second positioning body 314 protrudingly disposed on the column 311 and adjacent to the rotating block 313, and an outer diameter of the second positioning body 314 is smaller than an outer diameter of the rotating block 313.

The blocking element 32 has a ring-shaped plug 321 with an appropriate outer diameter and an appropriate thickness, and with a center hole coaxially sleeved around another axial end of the column 311, so that the plug 321 is capable of displacing with axial displacement of the column 311; and two airtight rings 322, 323 of different diameters respectively disposed on an outer peripheral side and on a wall of the center hole of the plug 321.

The auxiliary unit 40 has a second body part 41 and a second hook edge 42.

The second body part 41 has a sliding plate 411 with one side attached on the carrier plate 211; an arc sheet-shaped second arcuate wall 412 formed by extending outwardly from one side end of the sliding plate 411; an elongated hole 413 roughly in the shape of an ellipse penetrating the sliding plate 411, a length direction of the elongated hole 413 corresponds to a radial direction of the second arcuate wall 412; and a first positioning body 414 protrudingly disposed on an end of another side of the sliding plate 411 corresponding to the length direction of the elongated hole 413 and away from the second arcuate wall 412, thereby the second body part 41 can be properly positioned relative to the first body part 21 by sleeving around the column 311 by the elongated hole 413, the second arcuate wall 412 and the first arcuate wall 213 face each other with concave arc surfaces corresponding to each other so that their respective centers of curvature are interposed therebetween, and the sliding plate 411 is capable of being constrained by the column 311 to displace back and forth between a distant position and a close position within the length direction of the elongated hole 413. When the sliding plate 411 is at the distant position, the second arcuate wall 412 and the first arcuate wall 213 are separated by a first distance, when the sliding plate 411 is at the close position, the second arcuate wall 412 and the first arcuate wall 213 are separated by a second distance, and the second distance is smaller than the first distance.

The second hook edge 42 is protrudingly disposed on an inner concave arc surface of an extension end of the second arcuate wall 412, and has a radian the same as that of the inner concave arc surface of the second arcuate wall 412.

The connecting unit 50 has a connecting hole 51 extendingly penetrating through the column 311 along the column axis of the column 311, and a pipe joint 52 airtightly inserted into the connecting hole 51 to be located on one axial end of the column 311.

Figure 8:
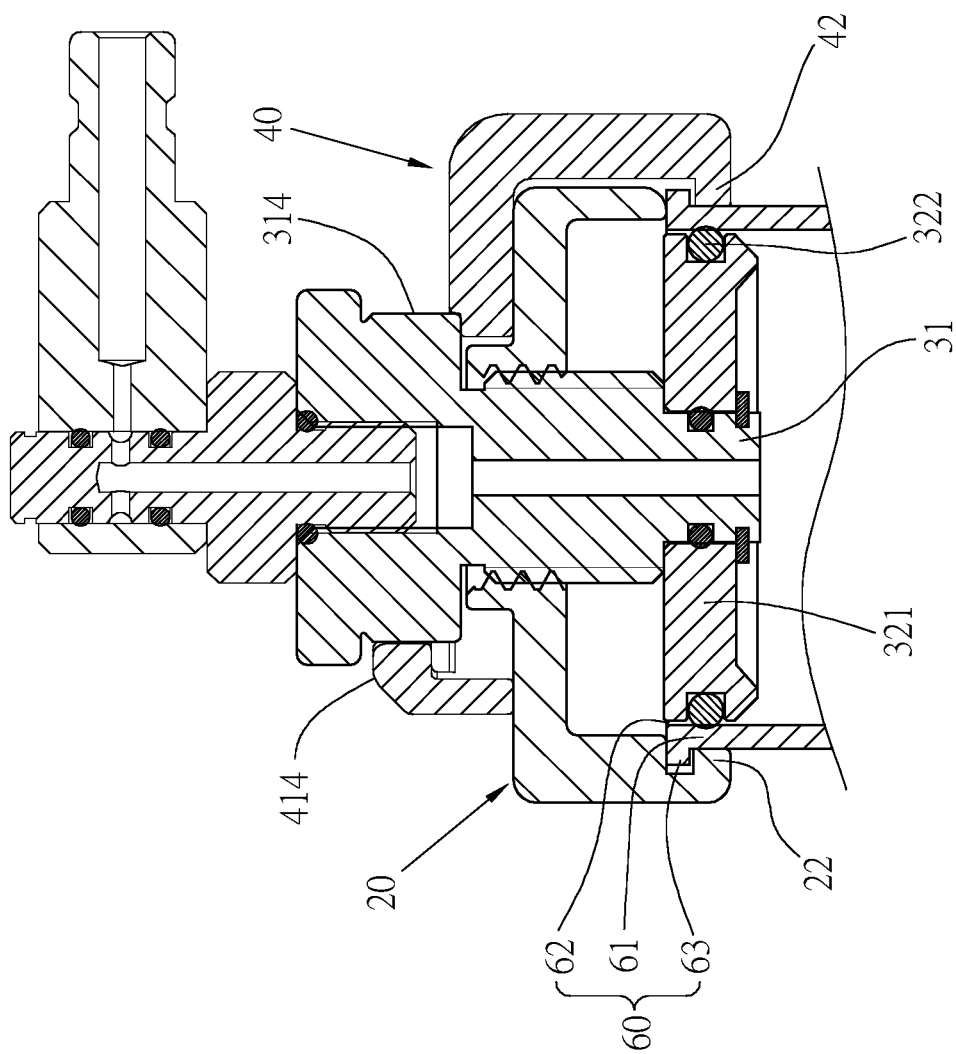
FIG. 8 is a cross-sectional view of a preferred embodiment of the invention snapped on the neck of the vessel showing that a plug is plugged into a tubular hole of the neck to block the opening.

Please refer to FIG. 8, the sealing mechanism 10 of the pressure vessel is used for sealing an opening 62 at an end of a tubular neck 61 of a vessel 60, so that an accommodating space inside vessel 60 does not communicate with outside through the opening 62, but is capable of communicating with outside through the connecting hole 51.

When in use, as shown in FIG. 6, the first hook edge 22 of the sealing mechanism 10 of the pressure vessel is hooked and snapped on a part of an annular opening edge 63 at a periphery side of a free end of the neck 61 of the vessel 60, and the annular opening edge 63 is synchronously embedded into the embedding groove 23, thereby the sealing mechanism 10 of the pressure vessel can be conveniently and quickly fixed on the neck 61.

Then, the sliding plate 411 can be moved from the distant position shown in FIG. 6 to the close position shown in FIG. 7 along the length direction of the elongated hole 413, so that the second hook edge 42 is hooked and snapped on another part of the annular opening edge 63 to assist the first hook edge 22 to form a stable hooking and snapping state on an entire circumference of the annular opening edge 63.

Then, an operator rotates the column 311 to drive the plug 321 to move from an open position to a blocked position to achieve an effect of sealing the opening 62 of the vessel 60. Wherein when the plug 321 is at the open position, the plug 321 is separated from the opening 62 of the vessel 60 without blocking the opening 62 as shown in FIGS. 6 and 7, but when the plug 321 is at the blocked position, the plug 321 is plugged into a tube hole of the neck 61 from the opening 62 as shown in FIG. 8, thereby an airtight state of combination between the plug 321 and an inner tube wall of the neck 61 and the column 311 is ensured by the airtight rings 322, 323 respectively.

When the column 311 performs the above-mentioned axial displacing movement, the column 311 also drives the second positioning body 314 to displace between a release position and a locked position synchronously, as shown in FIG. 6 and FIG. 7. When the second positioning body 314 is located at the release position, the second positioning body 314 is spaced apart from the first positioning body 414, so that the sliding plate 411 is not positioned, when the second positioning body 314 is located at the locked position, as shown in FIG. 8, the second positioning body 314 is interposed between the first positioning body 414 and the column 311, so that the sliding plate 411 is locked at the close position to ensure a combination state of the sealing mechanism 10 of the pressure vessel fixing on the neck 61.

In addition to the above, what needs to be mentioned is that a radian dimension of the first hook edge 22, in a case of not having the auxiliary unit 40, is preferably substantially a semicircle, such as a 180-degree angle, or an arc angle of the first hook edge 22 can be increased to about 195 degrees. When an angular degree is larger than a semicircle, the first body part 21 itself needs to have physical properties that can be deformed slightly, for example, the first body part 21 can be molded with a suitable plastic material to obtain a required deformation tolerance.

In a case of providing with the auxiliary unit, that is, as disclosed in the above-mentioned preferred embodiment of the invention, since the first hook edge and the second hook edge are used to clamp on two sides of the neck, radian dimension limitation is not indispensable, but for the convenience of use, a radian of the second hook edge can still be preferably less than 180 degrees, and a sum of radians of the first hook edge and the second hook edge is equal to or less than 360 degrees.

In addition, regarding the driving technology of using the column to drive the plug to change positions, it is not limited to the axial movement disclosed above, it can also be radial movement or achieved by other different driving means, such techniques are ancillary technical contents with respect to the object of the invention, and such changes, alterations or modifications do not affect realization of the object of the invention and should fall within the scope of protection claimed by the invention.

The above-mentioned embodiments are merely used to illustrate the technical ideas and features of the invention, with an object to enable any person having ordinary skill in the art to understand the technical content of the invention and implement it accordingly, the embodiments are not intended to limit the Claims of the invention, and all other equivalent changes and modifications completed based on the technical means disclosed in the invention should be included in the Claims covered by the invention.

What is claimed is:

1. A sealing mechanism of a pressure vessel for combining with a tubular neck of a vessel to seal an opening of the vessel at an end of the neck, comprising:
   a combination unit having a first body part, and a first hook edge protruded on a part of the first body part, the combination unit being combined on the neck by hooking and snapping on one side of the neck with the first hook edge, and another part of the first body part being located outside the opening of the vessel; and
   a sealing unit having a blocking element interposed between the first body part of the combination unit and the opening of the vessel, and a driving element disposed between the combination unit and the blocking element and capable of driving the blocking element to move between an open position and a blocked position by changing relative spatial positions between the driving element and the first body part;
   when the combination unit being combined with the neck, wherein when in the open position, the blocking element is spaced apart from the end of the neck and does not block the opening of the vessel, but when in the blocked position, the blocking element is abutted with the neck to block the opening of the vessel.

2. The sealing mechanism of the pressure vessel as claimed in claim 1, wherein the first body part further comprises a carrier plate, a ring wall extending outwardly from a peripheral end of the carrier plate, and an arc sheet-shaped first arcuate wall extending outwardly from a side end of the carrier plate and coaxially with the ring wall and protruding outside an end of the ring wall, and the first hook edge is protrudingly disposed on an inner concave arc surface of an extension end of the first arcuate wall to form an arcuate shape with a radian the same as that of the inner concave arc surface.

3. The sealing mechanism of the pressure vessel as claimed in claim 2, wherein the first body part further comprises an arcuate embedding groove defined by the inner concave arc surface of the first arcuate wall, an end surface of an end of the ring wall, and a side edge surface of the first hook edge opposite to the end surface of the end of the ring wall.

4. The sealing mechanism of the pressure vessel as claimed in claim 2, wherein the first body part further comprises an axial hole penetrating the carrier plate, and a hole axis of the axial hole is the same as a geometric center of the ring wall; the driving element has a column with a middle section of the column inserting into the axial hole, and one end of a column axis is located inside of the ring wall and combined with the blocking element.

5. The sealing mechanism of the pressure vessel as claimed in claim 4, further comprising a connecting unit; the connecting unit having a connecting hole extendingly penetrating through the column along the column axis of the column, and a pipe joint disposed on an orifice of the connecting hole at another end of the column axis of the column.

6. The sealing mechanism of the pressure vessel as claimed in claim 4, wherein the axial hole is a screw hole, the driving element has a screw thread annularly disposed on an outer peripheral side of the middle section of the column to be screwed and connected with the screw hole.

7. The sealing mechanism of the pressure vessel as claimed in claim 5, wherein the axial hole is a screw hole, the driving element has a screw thread annularly disposed on an outer peripheral side of the middle section of the column to be screwed and connected with the screw hole.

8. The sealing mechanism of the pressure vessel as claimed in claim 6, wherein the driving element further comprises a rotating block protruded on a peripheral side of the other end of the column axis of the column.

9. The sealing mechanism of the pressure vessel as claimed in claim 7, wherein the driving element further comprises a rotating block protruded on a peripheral side of the other end of the column axis of the column.

10. The sealing mechanism of the pressure vessel as claimed in claim 1, wherein the blocking element has a plug with a predetermined thickness, and a flexible airtight ring annularly sleeved on a peripheral side of the plug and capable of deforming by force.

11. The sealing mechanism of the pressure vessel as claimed in claim 10, wherein when the blocking element is located at the blocked position, the plug is inserted into the opening of the vessel, and the airtight ring is interposed between the plug and an inner tube wall of the neck.

12. The sealing mechanism of the pressure vessel as claimed in claim 1, further comprising an auxiliary unit; the auxiliary unit having a second body part adjacent to the first body part, and a second hook edge protruded on a part of the second body part, and geometrical centers of the second hook edge and the first hook edge being located between the first hook edge and the second hook edge.

13. The sealing mechanism of the pressure vessel as claimed in claim 12, wherein the second body part further comprises a sliding plate with one side attached on the first body part; an arc sheet-shaped second arcuate wall extending outwardly from one end of the sliding plate, and the second hook edge is protrudingly disposed on an inner concave arc surface of an extension end of the second arcuate wall to form an arcuate shape with a radian the same as that of the inner concave arc surface.

14. The sealing mechanism of the pressure vessel as claimed in claim 13, wherein the first body part further comprises a carrier plate with one side attached to the sliding plate, and an arc sheet-shaped first arcuate wall extending outwardly from a side end of the carrier plate, and the first hook edge is protrudingly disposed on an inner concave arc surface of an extension end of the first arcuate wall.

15. The sealing mechanism of the pressure vessel as claimed in claim 12, wherein the second body part further comprises a radially elongated hole extending along a radial direction of the second arcuate wall to penetrate the sliding plate.

16. The sealing mechanism of the pressure vessel as claimed in claim 15, wherein the driving element has a column inserting into the elongated hole, so that the sliding plate is capable of being constrained by the column to displace back and forth between a distant position and a close position along a length direction of the elongated hole, when the sliding plate is at the distant position, the second arcuate wall and the first arcuate wall are separated by a first distance, when the sliding plate is at the close position, the second arcuate wall and the first arcuate wall are separated by a second distance, and the second distance is smaller than the first distance.

17. The sealing mechanism of the pressure vessel as claimed in claim 16, wherein the second body part further comprises a first positioning body protrudingly disposed at a position on the sliding plate corresponding to the length direction of the elongated hole and away from the second arcuate wall.

18. The sealing mechanism of the pressure vessel as claimed in claim 17, wherein the driving element further comprises a second positioning body protrudingly disposed on a peripheral side of the column and abutted with the first positioning body to position the sliding plate at the close position.

19. The sealing mechanism of the pressure vessel as claimed in claim 18, wherein movement of the column along a direction of its column axis is capable of causing the second positioning body to displace between a release position and a locked position, when in the release position, the second positioning body and the first positioning body are separated from each other, when in the locked position, the second positioning body interposed between the first positioning body and the column is abutted with the first positioning body.

\* \* \* \* \*